US012739736B2

(12) United States Patent
Gopi et al.

(10) Patent No.: US 12,739,736 B2
(45) Date of Patent: Sep. 15, 2026

(54) CLOUD-ASSISTED DISTRIBUTED SERVICE DISCOVERY IN A WIRELESS NETWORK

(71) Applicant: Hewlett Packard Enterprise Development LP, Spring, TX (US)

(72) Inventors: Vinay Gopi, Bangaluru (IN); Anjanish Pandey, Bangaluru (IN); Suresh Vaidya, Bangaluru (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 441 days.

(21) Appl. No.: 18/205,776

(22) Filed: Jun. 5, 2023

(65) Prior Publication Data

US 2024/0406849 A1 Dec. 5, 2024

(51) Int. Cl.
*H04W 48/16* (2009.01)

(52) U.S. Cl.
CPC .................................. *H04W 48/16* (2013.01)

(58) Field of Classification Search
CPC .............................. H04W 48/02; H04W 16/24
USPC .......................................................... 455/434
See application file for complete search history.

(56) References Cited

U.S. PATENT DOCUMENTS 9,516,097 B1 12/2016 Ishvarchandra et al.
10,742,751 B2 8/2020 Agarwal et al.
2002/0143946 A1* 10/2002 Crosson .............. H04L 67/1012 709/230
2007/0197246 A1* 8/2007 Julian ................... H04W 48/20 455/515
2016/0119186 A1 4/2016 Xu et al.
2021/0029761 A1* 1/2021 Jung ..................... H04W 72/02
2021/0392192 A1* 12/2021 Machikoppa ......... H04L 67/568
2021/0399947 A1 12/2021 Devaraj et al.
2024/0349173 A1* 10/2024 Wakudkar ............. H04W 48/16
2025/0056239 A1* 2/2025 Wang .................... H04W 16/10

FOREIGN PATENT DOCUMENTS

CN 107800745 A 3/2018

OTHER PUBLICATIONS

Cheshire et al., "Multicast DNS", Internet Engineering Task Force (IETF), Request for Comments: 6762, Feb. 2013, 70 pages.
Cisco Technology Inc., "Bonjour Gateway Wireless LAN Controller Deployment Guide, Release 7.5," Nov. 2014, 24 pages.

* cited by examiner

*Primary Examiner* — Fabricio R Murillo Garcia
(74) *Attorney, Agent, or Firm* — Yao Legal Services, Inc.

(57) ABSTRACT

A system for facilitating service discovery at an access point is provided. During operation, the system can receive, from a cloud-based service management system, an enhanced record indicating a set of services provided by a service-providing device (SPD). The enhanced record can be associated with one or more policies that indicate which device is eligible for receiving a service provided by the SPD. The system can cache the enhanced record in a service cache in a local storage device of the access point. The system can then receive a request for discovering a service from a client device wirelessly coupled to the access point. Subsequently, the system can determine whether to respond to or filter out the request based on the enhanced record and the one or more policies. Upon determining not to filter out the request, the system can respond to the request based on the enhanced record.

20 Claims, 10 Drawing Sheets

DISTRIBUTED WIRELESS NETWORK 100
CONFIGURATION INTERFACE 138
LICENSE 108
CLOUD-BASED SERVICE MANAGEMENT SYSTEM 130
PACKET HANDLER 132
CACHE MANAGER 134
CACHE PUBLISHER 136
160
ADVERTISEMENT
CACHE DISTRIBUTION
SERVERS 102
CLOUD MANAGEMENT PLATFORM 170
168
162
AP GROUP 140
NETWORK 150
SERVICE CACHE 156
POLICY DS 158
AP GROUP 120
SERVICE CACHE 152
POLICY DS 154
AP GROUP 110
VLAN 106
VLAN 104
112
114
116
122
124
126
128
142
144
146
148
SPD 118
ROLE 172
ROLE 174

CLOUD-ASSISTED DISTRIBUTED SERVICE DISCOVERY IN A WIRELESS NETWORK

BACKGROUND

Field

The present disclosure relates to communication networks. More specifically, the present disclosure relates to a method and system for facilitating efficient service discovery at the access points (APs) in a wireless network based on a cloud-based service management system.

BRIEF DESCRIPTION OF THE FIGURES

In the figures, like reference numerals refer to the same figure elements.

DETAILED DESCRIPTION

Figure 1A:
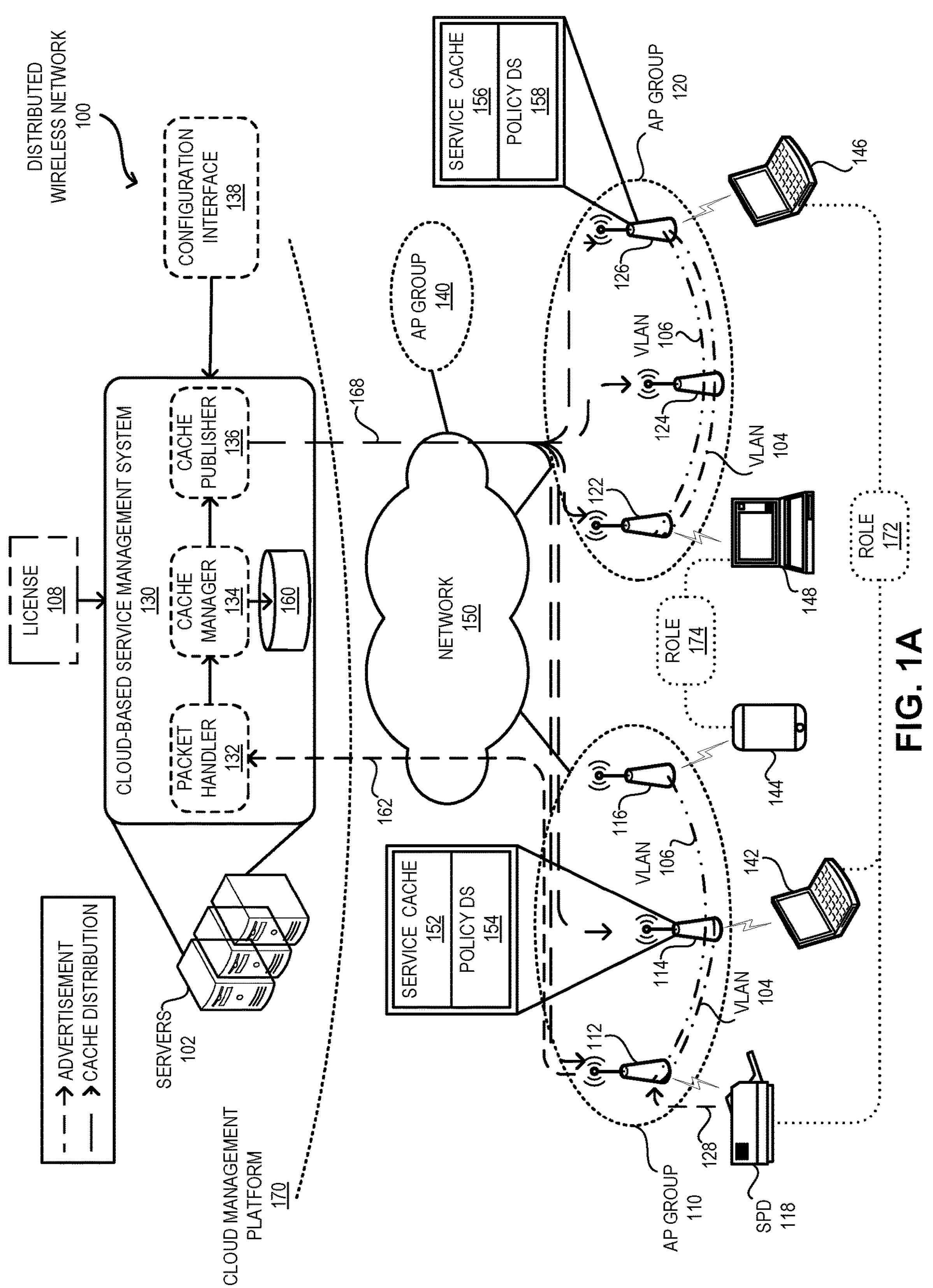
FIG. 1A illustrates an example of a wireless network supporting cloud-assisted service discovery at the APs, in accordance with an aspect of the present application.

A distributed wireless network (DWN) can include one or more groups of APs operating in conjunction with each other. A respective group of APs can facilitate wireless coverage for a geographic location, such as a floor of a multi-floor establishment. The APs of the group can provide the same Service Set Identifier (SSID) for the client devices (e.g., a host or an end device). A client device can wirelessly couple to any of the APs and can join a virtual local area network (VLAN) configured on the AP. Hence, client devices belonging to the VLAN can be distributed among multiple APs. The DWN can be managed with a cloud-based management platform, which can provision and control a respective AP of the network. Consequently, an AP may synchronize the control information received from locally coupled client devices with the management platform.

In some configurations, the AP may forward service control traffic, such as service advertisements and queries, from the locally coupled devices to the cloud (e.g., to the management platform). The advertisements and queries can be network packets generated based on a service discovery protocol (e.g., the Bonjour service). Based on the control information, the management platform may determine how a client device may obtain a service from a service-providing device (SPD). The management platform can store the service records advertised by the SPD. The client device can then forward a query via a wireless interface of the AP to the SPD, thereby ensuring distributed forwarding of service traffic. However, since the management platform may receive service-related control traffic from a large number of APs of a plurality of client deployments (e.g., belonging to different tenants), managing such traffic can be challenging.

The aspects described herein address the problem of managing service control traffic in a wireless network in a distributed way by (i) enhancing a service record obtained from a service advertisement at a cloud-based service management system (CSMS) based on corresponding policies, such as role-based segmentation policies; (ii) providing enhanced service records and relevant AP-level policies to a set of target APs for caching; and (iii) responding service queries from the enhanced service records cached at the APs. The CSMS may be deployed with the management platform. The CSMS can receive service advertisements from the SPDs and determine which target APs should cache the enhanced service record based on a selection mechanism. The service queries from the client devices can then be responded to by the APs in accordance with the AP-level policies. Since the traffic volume of service queries can be significantly larger than the traffic volume of service advertisements, offloading the responses to APs while enhancing the service records at the SPDs can allow the CSMS to efficiently manage service traffic.

With existing technologies, a group of APs in the DWN may provide the same SSID. A large DWN may include a plurality of such groups. Each group can be deployed in a geographic location, which may correspond to a site, a department or division, a floor of a multi-floor establishment, etc. A client device or an SPD can couple to an AP in its vicinity via the corresponding SSID to be connected to a local network. The local network can be a VLAN associated with a role associated with the user of the device. The roles can indicate a level of access and a set of privileges available to the user in the network and can be used to segment traffic accordingly. For example, an engineer of the enterprise can be associated with an “engineer” role while a visitor can be associated with a “guest” role.

When an SPD connects to an AP, the SPD can send a service advertisement that can include respective service records indicating one or more services provided by the SPD. For example, if the SPD is a multi-purpose printer, the advertisement can include respective service records of printing, scanning, and photocopying. On the other hand, if the SPD is a shared screen, the advertisement can include a service record of screen sharing. The SPD may use a discovery protocol (e.g., the Bonjour service) to advertise the services. A record-keeping mechanism, such as a multicast domain name service (mDNS) or simple service discovery protocol (SSDP), can be used to record the services advertised by the SPDs. Client devices in the network can use the discovery protocol to query for services offered by the SPDs.

Typically, the cloud management platform can maintain the service records for the network in a database (e.g., in one or more mDNS instances). When the client device sends a query to search for a service, the AP can receive the query and forward it to the cloud management platform. The cloud management platform can then look up the requested service in the database, determine the location of the service, and provide a response indicating the location of the service. However, the cloud management platform can be used for multiple tenants, each of which may support a client network with a large number of SPDs and client devices. The cloud management platform can then store a significant number of service records and serve a large number of queries, many of which can be simultaneous. Consequently, the cloud management platform may become a bottleneck and adversely affect service discovery in the network.

To address this problem, when an SPD in communication with an AP advertises its services, the advertising AP can forward the service records gleaned from advertisements to the CSMS. The CSMS can then identify respective service records indicating one or more services provided by the SPD. The CSMS can determine a set of policies associated with the SPD, the advertising AP, and the service records. Examples of the policies can include, but are not limited to, role-based segmentation rules, broadcast-domain-based traffic separation, security-level-based access rules, location-based access rules, and user-defined access rules. Some of these rules can be defined based on respective access control lists (ACLs). Subsequently, the CSMS can apply the set of policies to the service records to produce enhanced service records. Enhancement of a respective service record can include determining whether an AP should cache the service record and associating the service record with AP-level policies (e.g., the policies that can be applied by the APs). To do so, the CSMS may add the policy identifiers of the AP-level policies to the service record.

The CSMS can then determine a set of target APs for caching the service records at the eligible APs based on a selection mechanism. The selection mechanism can be based on one or more of: the vicinity of the advertising AP, a predetermined number of target APs, and eligibility of receiving the service records. For example, an AP may not be eligible to cache the service record if a VLAN of the SPD is not configured on the AP. The CSMS may also apply license filtering to determine the APs eligible for receiving the services provided by the SPD. The license filtering ensures that if the SPD is licensed for one department of an enterprise, the APs serving another department may not cache the service records even if there is no role-based traffic segmentation between the two departments.

The CSMS can then provide the enhanced service records and the AP-level policies to the target APs, which can then locally cache them. A respective AP may deploy an mDNS or SSDP instance to cache the enhanced service records. When a client device requests, via one of the target APs, a service provided by the SPD, the AP can apply the AP-level policies associated with the enhanced record, such as role-based traffic segmentation based on the respective roles of the client device and the SPD. Accordingly, the AP can determine whether the client device is eligible for receiving the service from the SPD. If eligible, the AP can respond with the service record from the local cache, thereby allowing the client device to discover the service. In this way, the CSMS and the APs can operate in conjunction with each other to facilitate cloud-assisted distributed service discovery with improved scalability.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of a wireless network supporting cloud-assisted service discovery at the APs, in accordance with an aspect of the present application. A DWN 100 can include a plurality of AP groups 110, 120, and 140. AP groups 110, 120, and 140 can be deployed in different geographic locations, which may correspond to different segments of an enterprise. A respective AP can be reachable from a network 150 (e.g., a wide-area network (WAN), such as an enterprise network or the Internet) via a corresponding backhaul link. A backhaul link can be a wired link (e.g., an optical cable) or a wireless link (e.g., a point-to-point wireless link). DWN 100 can be managed, controlled, and provisioned by a cloud management platform 170, which can operate on a set of servers 102 (e.g., in a datacenter) accessible via network 150.

AP group 110 can include a number of APs 112, 114, and 116; and AP group 120 can include a number of APs 122, 124, and 126. AP group 110 can provide the same SSID across APs 112, 114, and 116. Similarly, AP group 120 can provide the same SSID across APs 122, 124, and 126. A VLAN 104 can be configured at AP 112, 114, 122, 124, and 126; and another VLAN 106 can be configured at AP 112, 114, 116, 122, 124, and 126. An AP can be any device capable of establishing a wireless connection using wireless technology (e.g., Wi-Fi, cellular, Bluetooth, line-of-sight optical, infrared, etc.). When a client device is within the wireless signal range of an AP, the client device can wirelessly couple to the AP. Establishing such a wireless connection may include the user of the client device authenticating with corresponding credentials. Based on the authentication, the client device can be allocated a role that can indicate a level of access and a set of privileges available to the user in DWN 100.

Client devices 142 and 144 can wirelessly couple to cluster 110, and client devices 146 and 148 can wirelessly couple to cluster 120 via the corresponding SSIDs. A respective client can obtain an IP address from a subnet associated with its VLAN. In this example, client devices 142, 144, 146, and 148 can wirelessly couple to APs 114, 116, 126, and 122, respectively. A respective VLAN can be associated with a corresponding role. Hence, client devices belonging to a VLAN can be allocated the access and privileges of the role and can be used to segment traffic accordingly. Client devices 142 and 146 can be associated with role 172, and client devices 144 and 148 can be associated with role 174. For example, role 172 can indicate the role of "employee," while role 174 can indicate the role of "guest."

In DWN 100, the APs in an AP group can be coupled to each other via a management VLAN. A respective AP can share its information with other APs of the AP group via the management VLAN. In this way, AP 112 can learn the respective IP addresses of APs 114 and 116 via the management VLAN. An SPD 118 can couple to AP 112 via the corresponding SSID to be connected to DWN 100. SPD 118 may be associated with role 172. When SPD 118 connects to AP 112, SPD 118 can send a service advertisement 128 that can include the service records of the services provided by SPD 118. For example, if SPD 118 is a multi-purpose printer, advertisement 128 can include respective service records of printing, scanning, and photocopying. Advertisement 128 can be based on a discovery protocol, such as the Bonjour service. Client devices in DWN 100 can also use the discovery protocol to query for services offered by SPD 118.

Typically, the cloud management platform 170 can maintain the service records in a service database 160, which may include one or more mDNS instances. When client device 142 sends a query to search for the service offered by SPD 118, AP 114 can receive the query and forward it to cloud management platform 170. Cloud management platform 170 can then look up the requested service in database 160, determine the location of SPD 118 that provides that service, and provide a response indicating the location of SPD 118. However, cloud management platform 170 can be used for multiple tenants, each of which may support a client network with a large number of SPDs and client devices. Cloud management platform 170 can then store a significant number of service records in database 160 and serve a large number of queries, many of which can be simultaneous. Consequently, cloud management platform 170 may become a bottleneck and adversely affect service discovery in DWN 100.

To address this problem, DWN 100 can deploy a CSMS 130 capable of enhancing service records and caching them in a set of target APs. CSMS 130 can be incorporated into cloud management platform 170 and hence, can operate on servers 102. CSMS 130 can include a packet handler 132, a cache manager 134, and a cache publisher 136. CSMS 130 can also support a configuration interface 138 via which a user may define one or more policies to be implemented in DWN 100. Configuration interface 138 can be remotely accessible via the Internet, and may include a user interface (e.g., a graphical, textual, touch-sensitive, and/or gesture-based interface) provided by CSMS 130 or a browser-based interface.

When SPD 118 advertises its services using advertisement 128, AP 112 can forward the service records gleaned from advertisement 128 to CSMS 130. AP 112 can send a notification packet 162, which can be advertisement 128 from SPD 118 or a different packet. Packet handler 132 can then parse packet 162 to identify respective service records indicating one or more services provided by SPD 118. Cache manager 134 can determine a set of policies associated with SPD 118, AP 112, and the service records in packet 162. Examples of the policies can include, but are not limited to, role-based segmentation rules, broadcast-domain-based traffic separation, security-level-based access rules, location-based access rules, and user-defined access rules. Subsequently, cache manager 134 can apply the set of policies to the service records to produce enhanced service records. Cache manager 134 can store the enhanced service records in database 160. Enhancement of a respective service record can include determining whether an AP should cache the service record and associating the service record with AP-level policies. To do so, cache manager 134 may add the policy identifiers of the AP-level policies to the service record.

Cache manager 134 can then determine a set of target APs for caching the service records at the eligible APs based on a selection mechanism. The selection mechanism can be based on one or more of: the vicinity of AP 112, a predetermined number of target APs, and eligibility of receiving the service records. AP 116 may still be eligible to cache the service record even if VLAN 104 of SPD 118 is not configured on AP 116. Therefore, the service records can be associated with the respective broadcast domains of VLANs 104 and 106. In some configurations, SPD 118 can be associated with a license 108 that restricts access to SPD 118. Cache manager 134 may also apply license filtering based on license 108 to determine APs eligible for receiving the services provided by SPD 118. The license filtering ensures that if SPD 118 is licensed for one department of an enterprise, APs serving another department, such as AP group 140, may not cache the service records even if there is no role-based traffic segmentation between the two departments.

Cache publisher 136 can then send a distribution packet 168 that can include the enhanced service records and the AP-level policies to each of the target APs, such as APs 112, 114, 116, 122, 124, and 126. Upon receiving packet 168, a respective AP, such as AP 114, can locally cache the enhanced service records and the AP-level policies. For example, AP 114 may maintain a service cache 152 (e.g., an mDNS instance) to cache the enhanced service records. AP 114 can also maintain a policy data structure 154 in the local memory for storing the AP-level policies. Similarly, AP 126 may maintain a service cache 156 to cache the enhanced service records and a policy data structure 158 for storing the AP-level policies. A respective entry in service cache 152 can be associated with one or more entries of policy data structure 154 comprising policies applicable to the entry.

When client device 142 requests a service provided by SPD 118, AP 114 can apply the AP-level policies associated with the enhanced record. For example, if an AP-level policy is role-based traffic segmentation, AP 114 can determine that client device 142 and SPD 118 are associated with the same role 172. Accordingly, AP 114 can determine that client device 142 is eligible for receiving the service from SPD 118 and respond with the service record from the local cache. Hence, AP 114 can facilitate the discovery of the service without forwarding the service request from client device 142 to cloud management platform 170. On the other hand, if AP 112 receives a subsequent advertisement from service record 164 SPD 118, AP 112 can determine whether the advertisement includes any update. If the advertisement does not include an update (i.e., a duplicate advertisement) or includes an unsupported format, AP 112 can suppress the subsequent advertisement by discarding it. In this way, CSMS 130 and the APs can operate in conjunction with each other to facilitate cloud-assisted distributed service discovery in DWN 100.

Figure 1B:
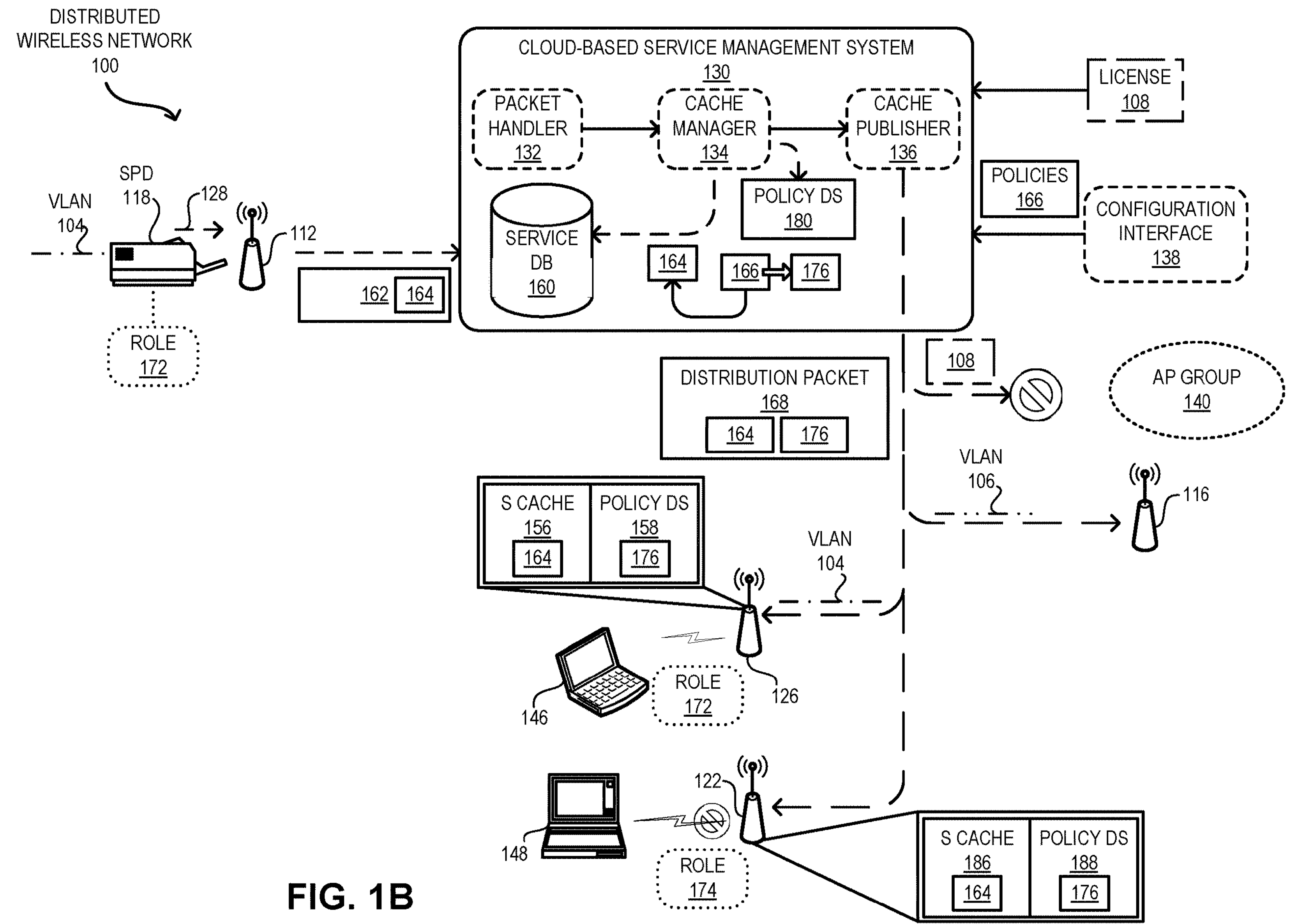
FIG. 1B illustrates an example of incorporating policies with service records for facilitating cloud-assisted service discovery at the APs in a wireless network, in accordance with an aspect of the present application.

FIG. 1B illustrates an example of incorporating policies with service records for facilitating cloud-assisted service discovery at the APs in a wireless network, in accordance with an aspect of the present application. AP 112 may maintain a service cache 182 to cache the enhanced service records and a policy data structure 184 for storing the AP-level policies. During operation, CSMS 130 can receive one or more policies 166 via configuration interface 138. CSMS 130 can then store policies 166 in a policy data structure, which can be a policy table. When AP 112 receives service advertisement 128 with a service record 164, AP 112 can determine whether service record 164 already exists in service cache 182. If service cache 182 does not include an entry corresponding to service record 164, AP 112 can forward packet 162 comprising service record 164 to CSMS 130.

Packet handler 132 can receive packet 162 and provide it to cache manager 134. Cache manager 134 can apply policies 166 to enhance service record 164. Such enhancement can include determining AP-level policies 176 from policies 166 and associating service record 164 with policies 176. Policies 176 may include a subset of policies 166 or encompass policies 166. Cache manager 134 may also apply license filtering based on license 108 to determine APs eligible for receiving service record 164. Suppose that AP 140 does not have the license for the services offered by SPD 118. The license filtering ensures that AP group 140 does not receive an advertisement from SPD 118. Cache manager 134 can then determine a set of target APs in accordance with policies 166.

In this example, cache manager 134 may select AP 116 as a target AP, thereby allowing devices on VLAN 106 to receive service from SPD 118 even though SPD 118 can be on a different VLAN 104. Hence, the enhanced service record is associated with a set of broadcast domains that are allowed to receive the set of services from SPD 118. Similarly, cache manager 134 can also select APs 122 and 126 as target APs based on a selection mechanism. Cache publisher 136 can then send a distribution packet 168 (e.g., based on the Bonjour service) comprising service record 164 and relevant policies 176 and forward it to the set of target APs. AP 126 can apply policies 176 to determine whether service records 164 can be cacheable. For example, if AP 126 does not serve a client device allowed to receive a service from role 172, service records 164 may not be cacheable. If cacheable, AP 126 can store service record 164 in service cache 156 and polices 176 in policy data structure 158. In the same way, AP 122 can store service record 164 in service cache 186 and polices 176 in policy data structure 188.

When client device 146 requests a service provided by SPD 118, AP 126 can identify service record 164 in service cache 156. AP 126 can also determine associated policies 176 and apply policies 176 to determine client device 146's eligibility. If policies 176 include role-based segmentation, AP 126 may determine whether the association with role 172 allows client device 146 to receive service from SPD 118. If allowed, AP 126 can provide a response from service cache 156. Client device 146 can then send a service request for the requested service based on service record 164. AP 126 can then send the service request to SPD 118.

On the other hand, when client device 148 requests the service, AP 122 can identify service record 164 in service cache 186. AP 122 can also determine associated policies 176 in policy data structure 188 and apply policies 176. AP 126 may determine whether the association with role 174 allows client device 148 to receive service from SPD 118. Since role-based segmentation may prevent inter-role traffic between roles 172 and 174, AP 122 may not provide a response from service cache 156 and discard the request.

Figure 2:
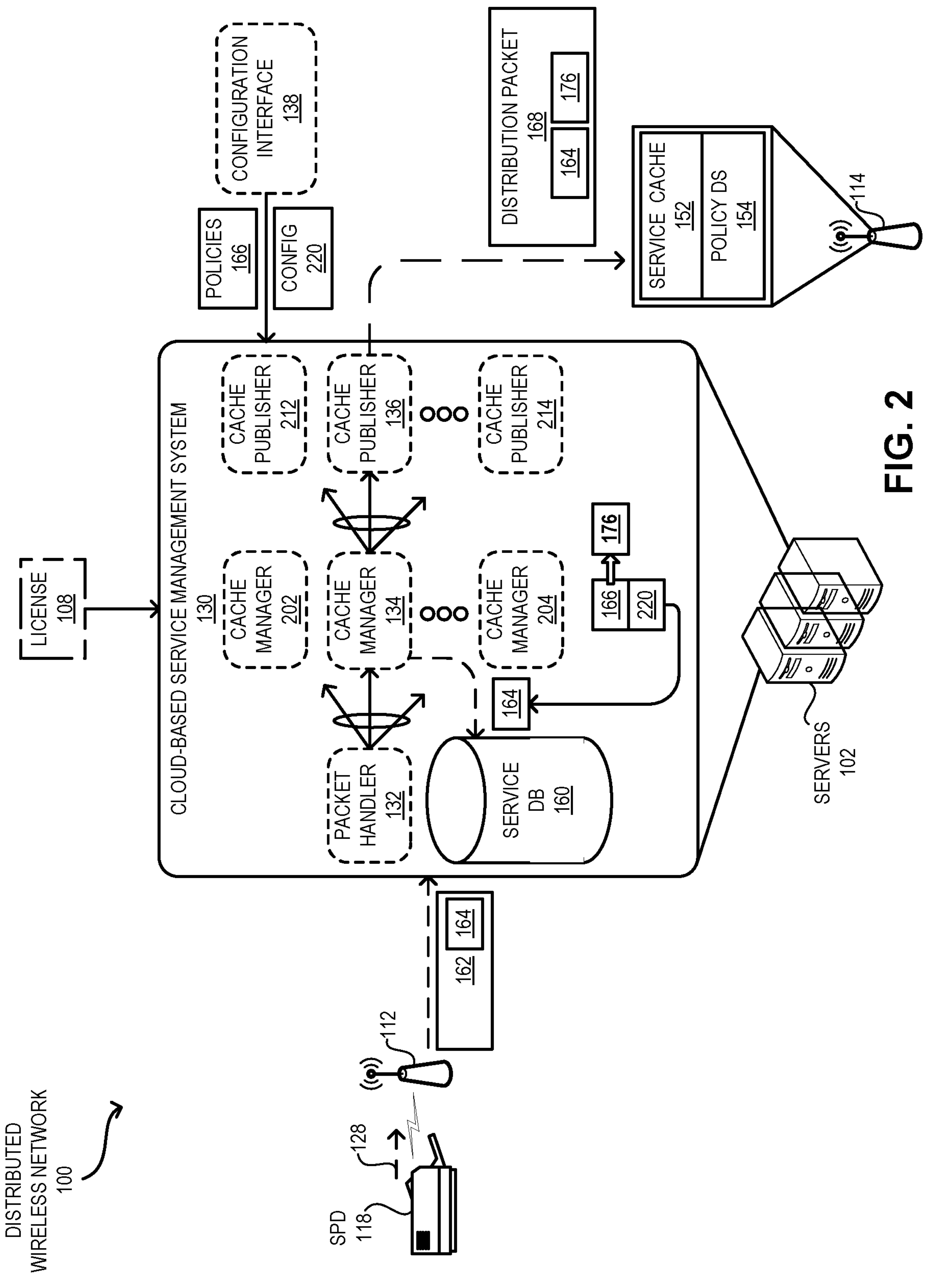
FIG. 2 illustrates an example of a cloud-based service management system (CSMS) assisting with efficient service discovery at the APs in a wireless network, in accordance with an aspect of the present application.

FIG. 2 illustrates an example of a CSMS assisting with efficient service discovery at the APs in a wireless network, in accordance with an aspect of the present application. CSMS 130 can be deployed across a plurality of servers in servers 102. CSMS 130 may support multiple instances of cache manager and cache publisher running on different servers, thereby distributing the computational load. In this example, CSMS 130 can include a number of cache manager instances (or cache managers) 134, 202, and 204 running on the same or different servers. Similarly, CSMS 130 can include a number of cache publisher instances (or cache publishers) 136, 212, and 214 running on the same or different servers. Configuration interface 138 allows a user or administrator to provide one or more policies 166 for the service advertisements received by CSMS 130. The user may also provide configuration 220 that can be applicable to an SPD, a VLAN, one or more APs, and a type of service.

Packet handler 132 of CSMS 130 can use a distribution mechanism to distribute (or spray) service advertisements among the cache managers. Examples of the distribution mechanism can include, but are not limited to, round-robin distribution, load-based distribution, random distribution, and policy-based distribution where some policies are managed by specific cache managers. If a cache manager instance is added or removed, packet handler 132 can readjust the distribution mechanism accordingly. Upon receiving packet 162 from AP 112, packet handler 132 can apply the distribution mechanism and select cache manager 134 for processing packet 162.

Cache manager 134 can then apply configuration 220 and policies 166 on service record 164 in packet 162. Cache manager 134 can also determine the location where the service indicated in service record 164 can be available. The location can be referred to as the visibility domain of SPD 118 and can be represented by the set of target APs. The target APs can be selected based on adjacency to AP 112 or a configured static policy. For service record 164, cache manager 134 may determine a replication number that can determine the number of target APs. The replication number can be a predetermined number or determined based on the number of APs available within a threshold distance from AP 112. Cache manager 134 can then store service record 164 in database 160. Cache manager 134 can also restrict access to the service based on license 108 by applying license-based filtering. Cache manager 134 can use a distribution mechanism to distribute (or spray) the service records among the cache publishers. The respective distribution mechanisms of packet handler 132 and cache manager 134 can be the same or different.

Cache manager 134 can also maintain the coherency for service record 164, which ensures that the up-to-date version of service record is maintained in database 160 and cached at the target APs. To ensure coherency, cache manager 134 can maintain a hash value for AP 112 for records learned from AP 112. Cache manager 134 can also identify the current version of service record 164 based on a sequence number. The sequence number can indicate the version of service record 164 and operate as a unique record identifier for service record 164. If a new version of service record 164 is received, the sequence number can be updated when the new version is propagated to the target APs. Based on the updated sequence number, the target APs can determine that service record 164 has been updated and update their local cache accordingly. Hence, cache manager 134 can update service records based on updates received from APs and propagate the updated cache records to the corresponding target APs.

Cache manager 134 can store the identifiers (e.g., network addresses) of the set of target APs in association with the service record 164 in database 160. The identifiers of a respective AP can include one or more of: an Internet Protocol (IP) address, a media access control (MAC) address, and an internal identifier that can uniquely identify the AP within DWN 100. If an AP, such as AP 114, needs to re-populate service cache 152 and policy data structure 154 (e.g., due to a reboot or error), AP 114 can send a request to CSMS 130. Cache manager 134 can then determine the service records propagated to AP 114 from database 160 and provide the service records to AP 114. For example, cache manager 134 can determine that AP 114 has previously stored service record 164 and provide service record 164 to AP 114 via a corresponding cache publisher.

To determine the cache publisher for distributing service record 164, cache manager 134 can apply the distribution mechanism on service record 164 and select cache publisher 136. Cache publisher 136 can determine the identifiers of the target APs. Cache publisher 136 can then send a distribution packet 168 comprising service record 164 and AP-level policies 176 to a respective AP of the target APs. Cache publisher 136 can facilitate the bookkeeping of counter value. While distributing service record 164, cache publisher 136 can generate or update the counter value for the current version, which can be the initial version, of service record 164. In the same way, if service record 164 is updated, cache publisher 136 can update the counter value while distributing the updated service record 164. The counter value allows cache publisher 136 to determine whether the cache at an AP is out of synchronization and provide the updated version of the impacted service records.

Figure 3:
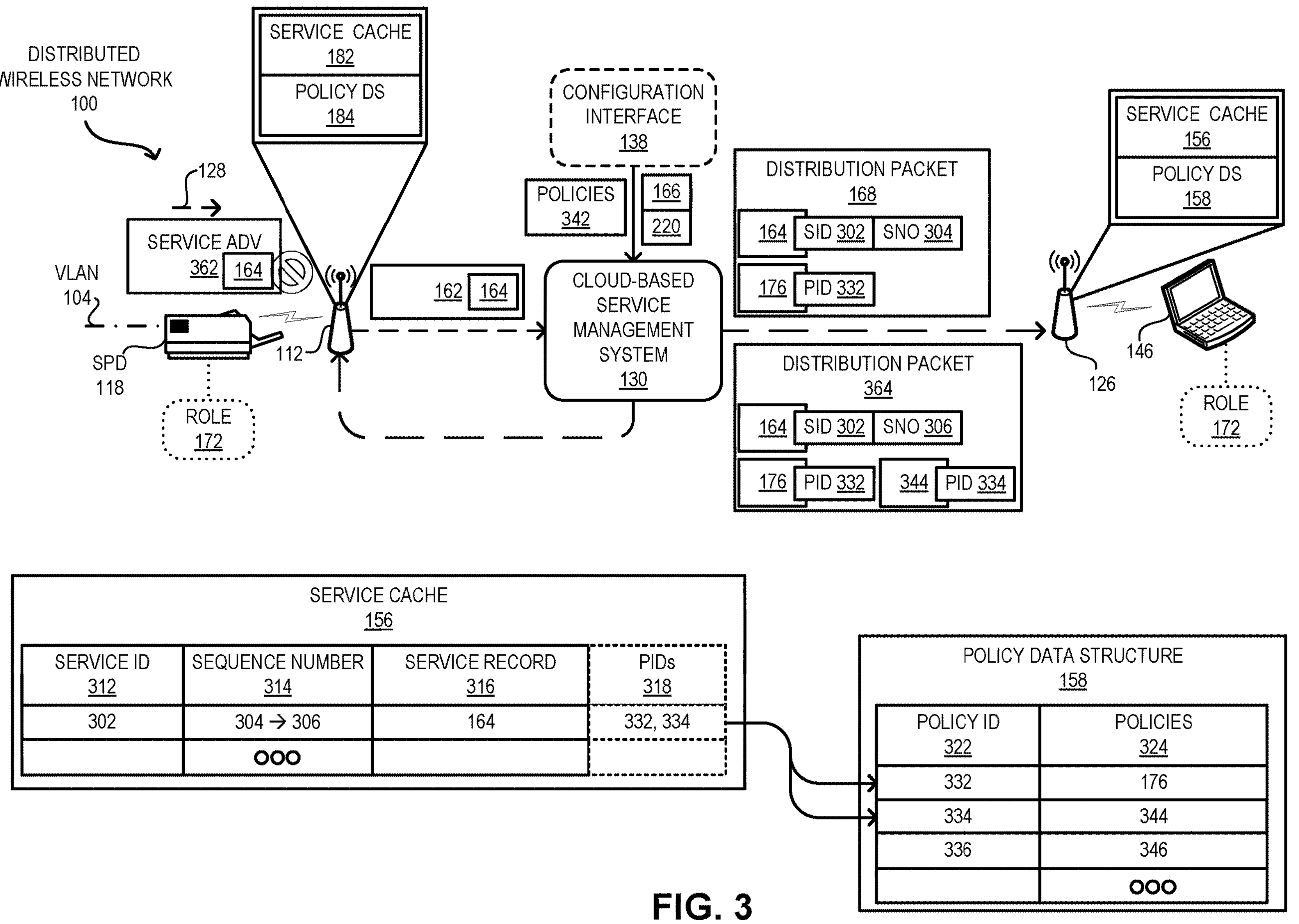
FIG. 3 illustrates an example of an AP caching service records and associated policies, in accordance with an aspect of the present application.

FIG. 3 illustrates an example of an AP caching service records and associated policies, in accordance with an aspect of the present application. When AP 112 receives advertisement 128, AP 112 can obtain service record 164 and check whether cache 182 includes an entry matching service record 164. If no match is detected, AP 112 can send packet 162 comprising service record 164 to CSMS 130. Packet 162 can be advertisement 128 or a separate notification packet generated at AP 112. Finding a match can include determining the presence of an entry that does not have a difference with service record 164 obtained from advertisement 128. In other words, a match may not be detected if no such entry is present in service cache 182 or if service record 164 includes updated information with respect to an existing entry in service cache 182. Upon receiving packet 162, CSMS 130 can obtain service record 164 and enhance service record 164 by applying policies 166 and configuration 220.

CSMS 130 can also incorporate a service identifier 302, which can be a hash value, and a sequence number 304 into service record 164. Service identifier 302 can uniquely identify service record 164 within DWN 100; and sequence number 304 can uniquely identify a version of service record 164. CSMS 130 can determine AP-level policies 176 from policies 166, allocate policy identifier 332 to policies 176, and associate policy identifier 332 with service record 164. Subsequently, CSMS 130 can include enhanced service record 164, service identifier 302, and sequence number 304 in a distribution packet 168. CSMS 130 may also include policies 176 and policy identifier 332 into packet 168 and send the packet to a respective target AP, such as APs 112 and 126. Alternatively, CSMS 130 may provide the policies separately to a respective AP of DWN 100. Under such circumstances, distribution packet 168 may include the policy identifiers associated with policies 176 without including individual policies.

AP 126 can apply policies 176 to determine whether service records 164 can be cacheable. For example, if AP 126 does not serve a client device allowed to receive a service from role 172, service records 164 may not be cacheable. If cacheable, AP 126 can store service record 164 in an entry in service cache 156 and policies 176 in policy data structure 158. Columns of service cache 156 can include, but are not limited to, a service identifier 312, sequence number 314, and service record 316. On the other hand, columns for policy data structure 158 can include, but are not limited to, a policy identifier 322 and policies 324. A respective entry or row of service cache 156 can be associated with one or more entries of policy data structure 158. The association can be established by adding the policy identifiers 318 column to service cache 156 (denoted with dotted lines). For a respective entry in service cache 156, policy identifiers 318 may include the policy identifiers of the policies applicable to the entry. The association may also be established by maintaining a separate table that can map service identifier 312 to policy identifiers 318.

When AP 126 receives distribution packet 168, AP 126 can insert service identifier 302, sequence number 304, service record 164, and policy identifier 332 into an entry of service cache 156. AP 126 can also insert policy identifier 332 and policies 166 into policy data structure 158. Policy data structure 158 can include entries for other policies, such as policies 346 with policy identifier 336, that are not applicable to service record 164. AP 112 can also generate similar entries in service cache 182 and policy data structure 184. If client device 146 sends a request for the service, AP 126 can look up the service in service cache 156 and determine corresponding policies 176 from policy data structure 158 based on policy identifier 332. AP 126 can then determine whether client device 146 is eligible for receiving the service from SPD 118. Since the bulk of the service traffic include client requests, offloading the client requests to the APs can relieve CSMS 130 from significant computational and resource overhead.

If SPD 118 sends a subsequent service advertisement 362 with service record 164, AP 112 can determine whether advertisement 362 indicates an update. To do so, AP 112 can determine whether service record 164 in advertisement 362 matches service record 164 in service cache 156. If a match is detected, AP 112 can suppress advertisement 362 by discarding it. On the other hand, if service record 164 in advertisement 362 is different (or updated) than service record 164 in service cache 156, AP 112 can forward advertisement 362 to CSMS 130. Therefore, AP 112 can forward new or updated advertisements while suppressing duplicate advertisements, thereby facilitating efficient use of network bandwidth in DWN 100.

Suppose that the user provides one or more new policies 342 applicable to service record 164. CSMS 130 can determine AP-level policies 344 from policies 342, allocate policy identifier 334 to policies 344, and associate policy identifier 3344 with service record 164. CSMS 130 can then further enhance service record 164 by applying policies 342. Because service 164 has been updated, CSMS 130 can generate a new sequence number 306, which can be generated by incrementing sequence number 304. CSMS 130 can include enhanced service record 164, service identifier 302, and sequence number 306 in a distribution packet 364. CSMS 130 may also include policies 176 and 344, and their respective policy identifiers 332 334 into packet 168. Subsequently, CSMS 130 can send the packet to a respective target AP, such as APs 112 and 126.

When AP 126 receives packet 364, AP 126 determines that the sequence number has been updated. Accordingly, AP 126 can update the entry in service cache 156 by replacing the existing sequence number and service record with the instances in packet 364. Alternatively, AP 126 can generate a new entry in service cache 156 with the new sequence number and service record in packet 364. AP 126 can also include policy identifier 334 in the updated or new entry. As a result, the entry can become associated with both polices 176 and 344. In this way, an entry for a service record can be updated based on updates from both SPD 118 and CSMS 130.

Figure 4A:
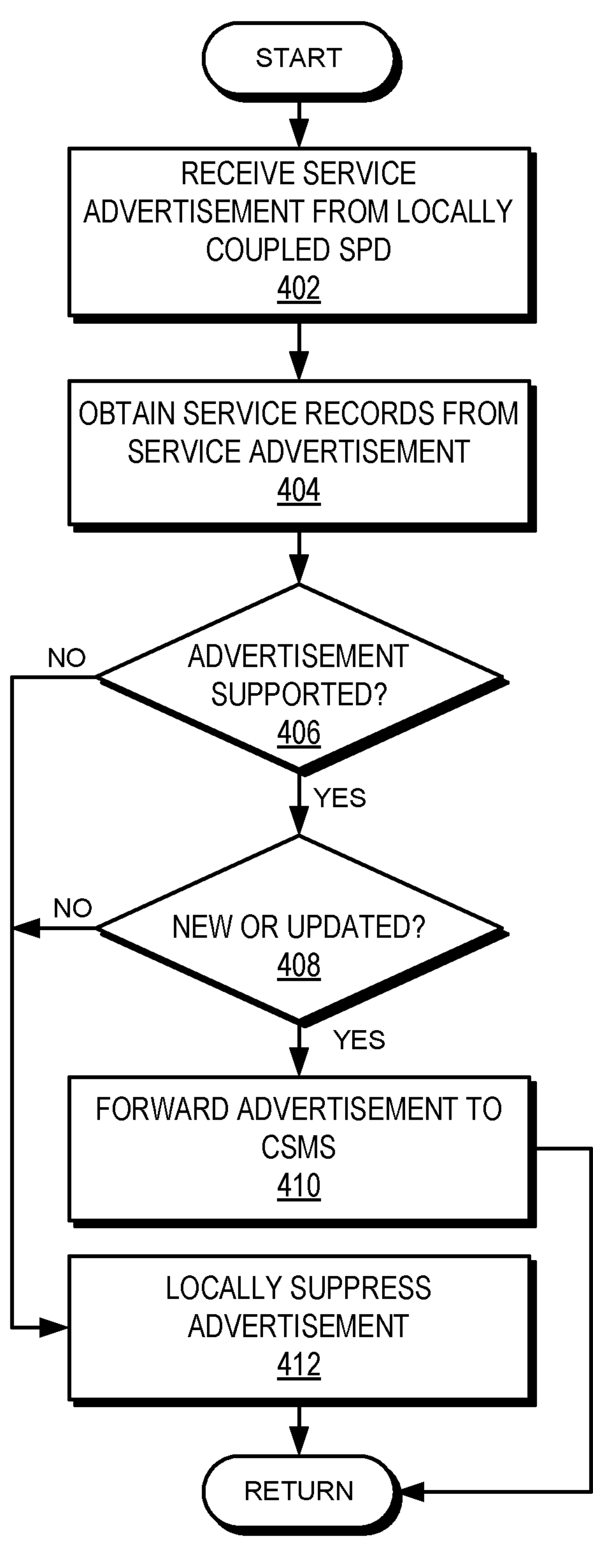
FIG. 4A presents a flowchart illustrating an example of a process of an AP processing a service advertisement, in accordance with an aspect of the present application.

FIG. 4A presents a flowchart illustrating an example of a process of an AP processing a service advertisement, in accordance with an aspect of the present application. During operation, the AP can receive a service advertisement from a locally coupled SPD (operation 402) and obtain service records from the service advertisement (operation 404). The AP can then determine whether the advertisement is supported (operation 406). For example, the version of the discovery protocol instances at the AP and the SPD can be different. If the advertisement is supported, the AP can determine whether the advertisement is new or updated (operation 408). If the advertisement is new or updated, the AP can forward the advertisement to the CSMS (operation 410). On the other hand, if the advertisement is not supported or is new or updated (operation 406 or 408), the AP can local suppress the advertisement (e.g., by discarding it at the AP) (operation 412).

Figure 4B:
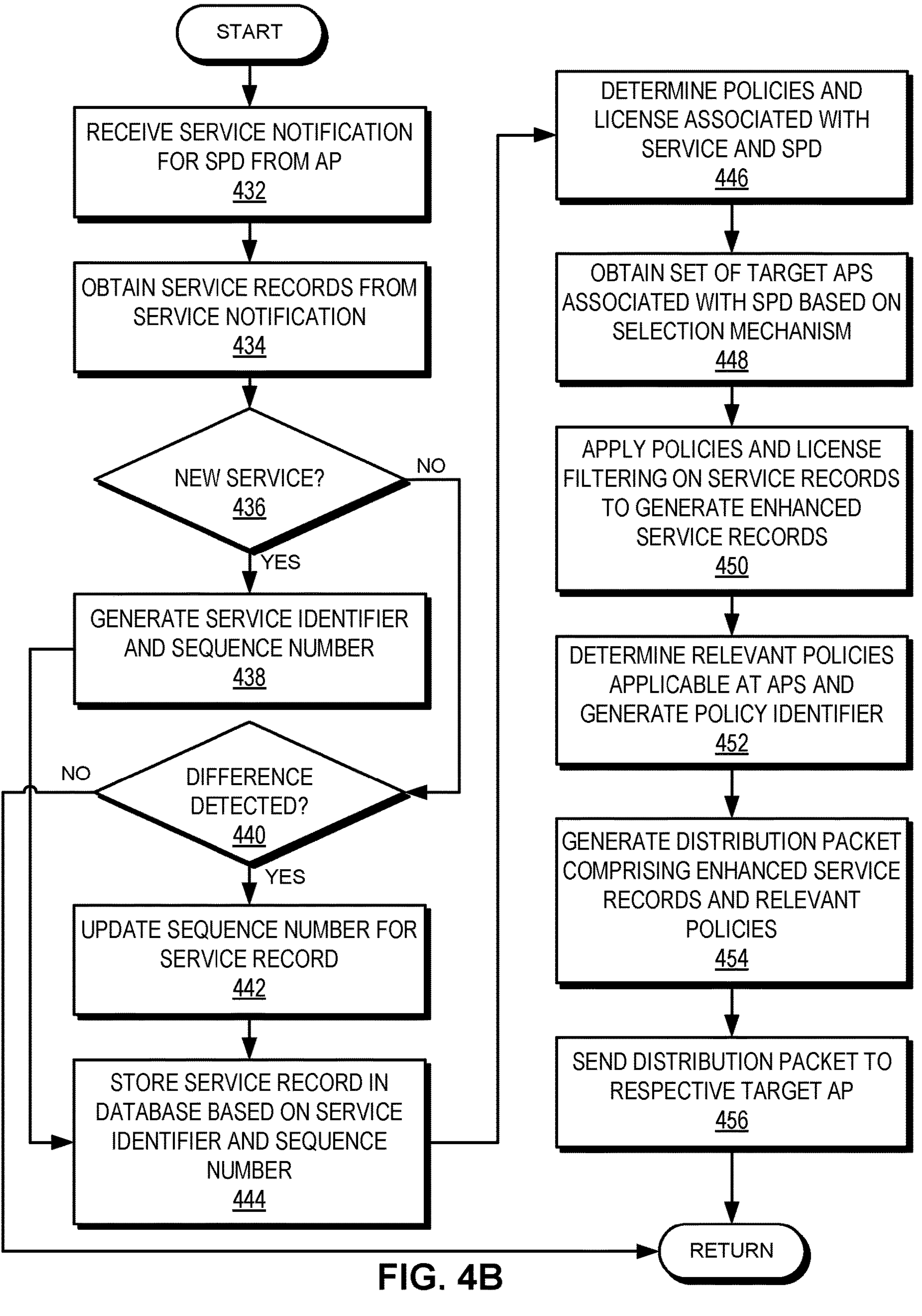
FIG. 4B presents a flowchart illustrating an example of a process of a CSMS distributing service records and associated policies to the APs in a wireless network, in accordance with an aspect of the present application.

FIG. 4B presents a flowchart illustrating an example of a process of a CSMS distributing service records and associated policies to the APs in a wireless network, in accordance with an aspect of the present application. During operation, the CSMS receive a service notification for an SPD from an AP (operation 432) and obtain service records from the service notification (operation 434). The CSMS can determine whether the service records correspond to a new service (operation 436). The CSMS can look up the service record in a local database (e.g., an mDNS instance) to determine whether the service records correspond to a new service. If the service records correspond to a new service, the CSMS can generate a service identifier and sequence number (operation 438).

On the other hand, if the service records don't correspond to a new service, the CSMS can determine whether a difference is detected (operation 440). The CSMS can compare respective instances of the service record in the advertisement and the local database to determine the difference. If a difference is detected, the service record in the advertisement includes an update. The CSMS can then update the sequence number for the service record (operation 442). Upon generating the service and sequence numbers or updating the sequence number (operation 438 or 442), the CSMS can store the service record in the database based on the service identifier and the sequence number (operation 444).

The CSMS can then determine policies and license associated with the service and the SPD (operation 446). The CSMS can also obtain a set of target APs associated with the SPD based on a selection mechanism (operation 448). The CSMS can apply the policies and license filtering on the service records to generate enhanced service records (operation 450). Subsequently, the CSMS can determine the relevant policies applicable at the APs, which are the AP-level policies, and generate the policy identifier (operation 452). The CSMS can then generate a distribution packet comprising the enhanced service records and the relevant policies (operation 454) and send the distribution packet to a respective target AP (operation 456).

Figure 4C:
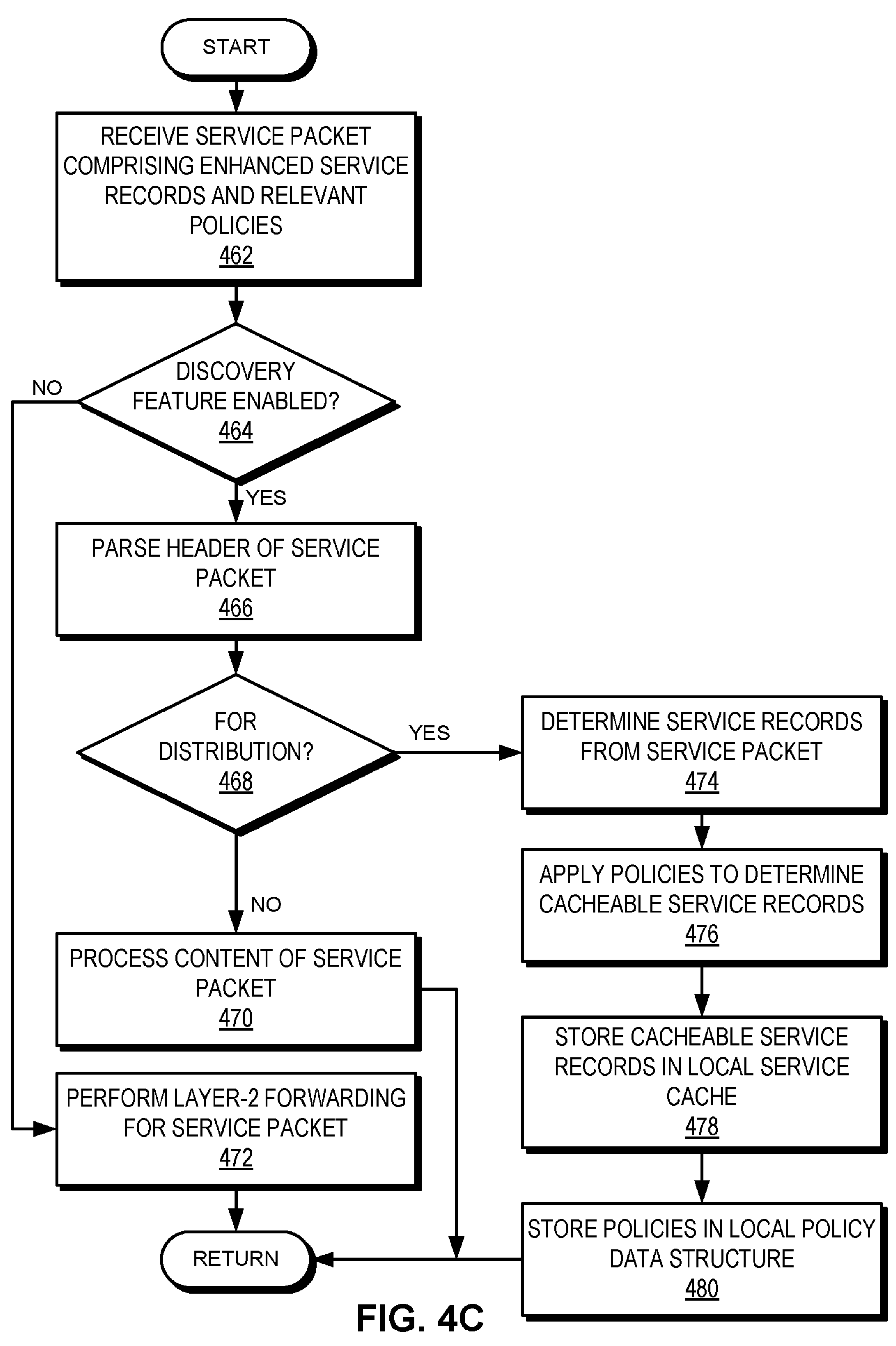
FIG. 4C presents a flowchart illustrating an example of a process of an AP caching service records and associated policies, in accordance with an aspect of the present application.

FIG. 4C presents a flowchart illustrating an example of a process of an AP caching service records and associated policies, in accordance with an aspect of the present application. During operation, the AP can receive a service packet, which can be packet issued based on the discovery protocol, comprising enhanced service records and relevant policies (operation 462). The AP can then determine whether the service discovery feature is enabled (operation 464). If the service discovery feature is not enabled, the AP can perform layer-2 forwarding for the service packet. On the other hand, if the service discovery feature is enabled, the AP can parse the header of the service packet (operation 466) and determine whether the service packet is for distribution (operation 468).

If the service packet is for distribution, the packet can be a distribution packet. The AP can then determine the service records from the service packet (operation 474) and apply policies to determine cacheable service records (operation 476). Subsequently, the AP can store the cacheable service records in the local service cache (e.g., an mDNS instance) (operation 478). The AP can also store the policies in the local policy data structure (operation 480). However, if the packet is not for distribution, the AP can process the content of the service packet (operation 470).

Figure 5:
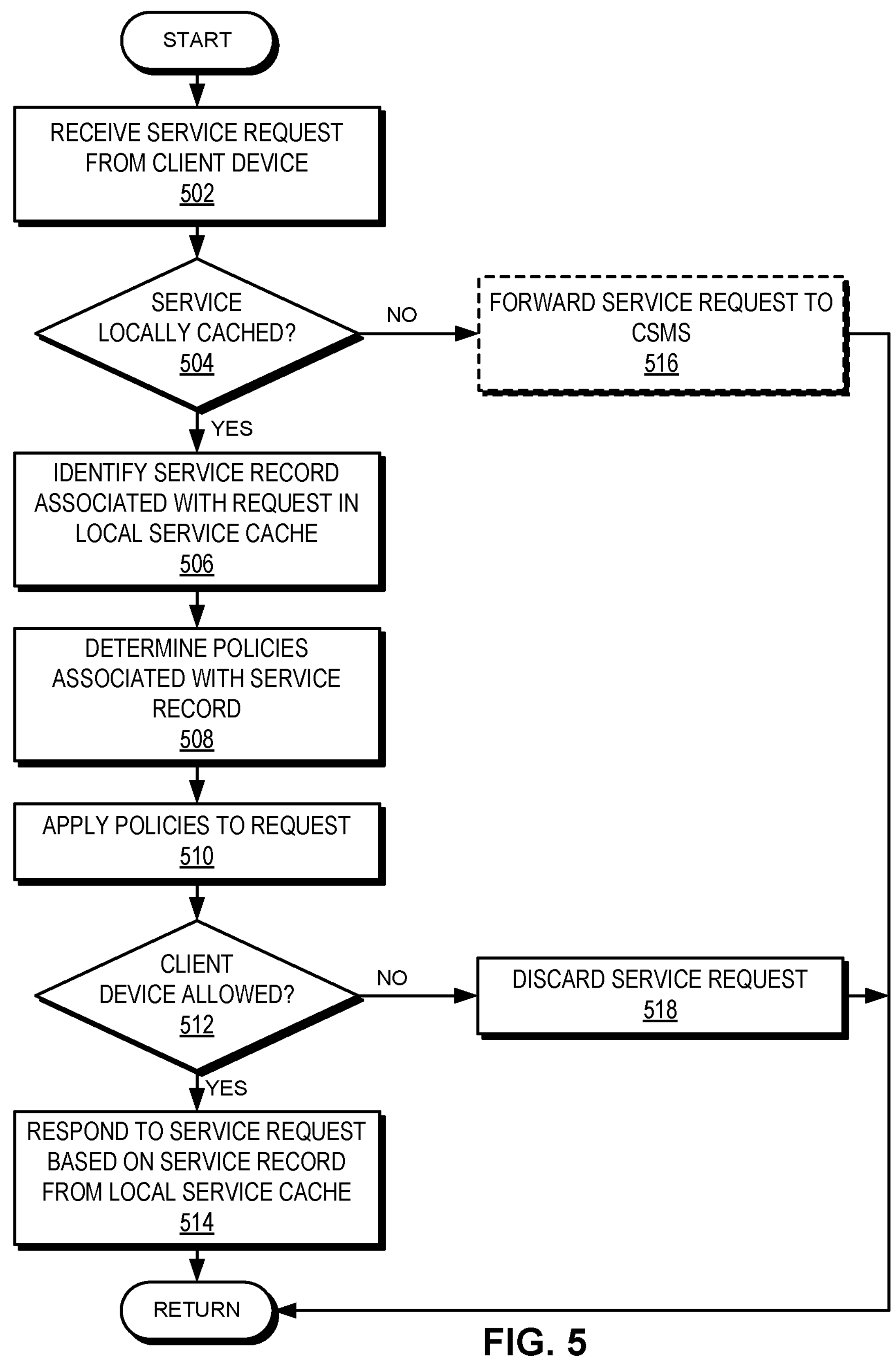
FIG. 5 presents a flowchart illustrating an example of a process of an AP responding to a service query service records and associated policies, in accordance with an aspect of the present application.

FIG. 5 presents a flowchart illustrating an example of a process of an AP responding to a service query service records and associated policies, in accordance with an aspect of the present application. During operation, the AP can receive a service request from a client device (operation 502) and determine whether the service is locally cached (operation 504). If the service is not locally cached, the AP can, optionally, forward the service request to the CSMS (operation 516) (denoted with dashed lines). If the service is locally cached, the AP can identify a service record associated with the request in the local service cache (operation 506) and determine policies associated with the service record (operation 508).

The AP can apply the policies to the request (operation 510). Applying the policies can include comparing the parameters of the policies (e.g., roles, restrictions, etc.) with the corresponding parameters associated with the request and the client device. The AP can then determine whether the client device is allowed to receive the service (operation 512). If the client device is allowed to receive the service, the AP can response to the service request based on the service record from the local service cache (operation 514). On the other hand, if the client device is not allowed to receive the service, the AP can discard the service request (operation 518).

Figure 6:
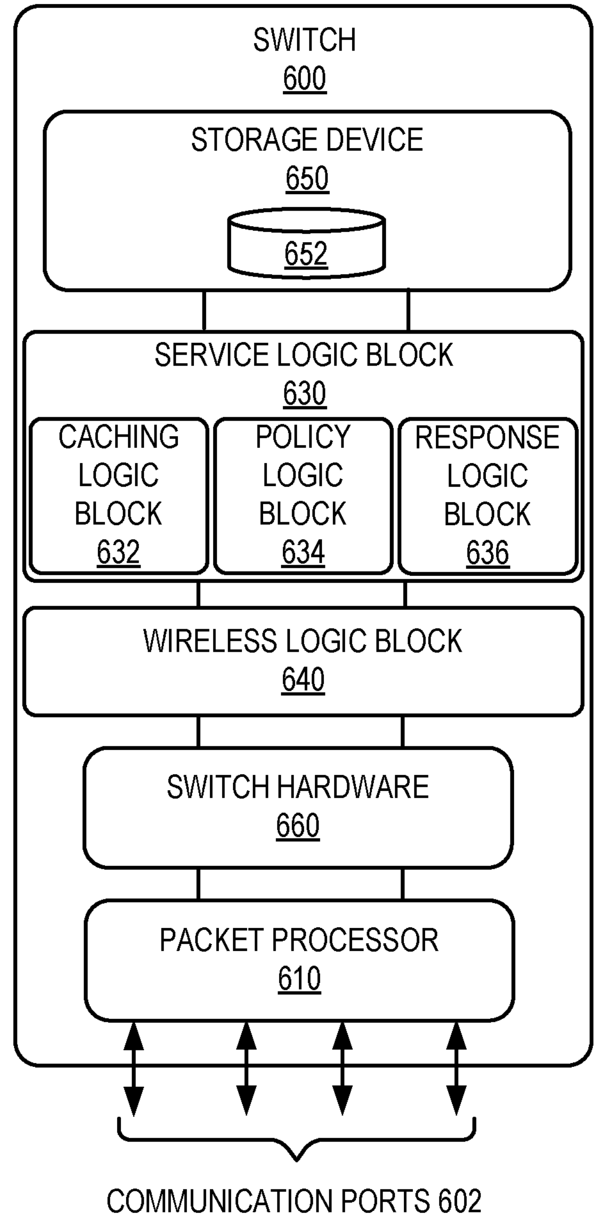
FIG. 6 illustrates an example of a switch that operates as an AP and supports cloud-assisted service discovery, in accordance with an aspect of the present application.

FIG. 6 illustrates an example of a switch that operates as an AP and supports cloud-assisted service discovery, in accordance with an aspect of the present application. In this example, a switch 600 can include a number of communication ports 602, a packet processor 610, and a storage device 650. Switch 600 can include a wireless logic block 640 that allows switch 600 to operate as an AP (e.g., AP 112 in FIG. 1). Switch 600 can also include switch hardware 660 (e.g., processing hardware of switch 600, such as its application-specific integrated circuit (ASIC) chips), which includes information based on which switch 600 processes packets (e.g., determines output ports for packets).

Switch hardware 660 can include circuitry for a wireless interface that allows switch 600 to communicate wirelessly based on a wireless technology. Examples of the wireless technology can include but are not limited to, the Institute of Electrical and Electronics Engineers (IEEE) 802.11 standards, a cellular technology (e.g., nth generation or nG cellular technology), Bluetooth, line-of-sight optical, and infrared. Packet processor 610 can extract and processes header information from the received packets.

Packet processor 610 can identify a switch identifier (e.g., a MAC address and/or an IP address) associated with switch 600 in the header of a packet. Switch 600 can maintain a database 652 (e.g., in storage device 650). Database 652 can be a relational database and may run on one or more Database Management System (DBMS) instances. Database 652 can store information associated with routing, configuration, and interface of switch 600. Database 652 may store the local service cache and policy data structure of switch 600.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header over a wired or wireless connection. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can include a service logic block 630 that can facilitate efficient service discovery at switch 600. Service logic block 630 can include a caching logic block 632, a policy logic block 634, and a response logic block 636. Caching logic block 632 can determine whether to suppress or forward a service advertisement. Caching logic block 632 can cache an enhanced service record received from a CSMS in the local service cache. Furthermore, caching logic block 632 may store a policy received from a CSMS in the local policy data structure. Policy logic block 634 can determine whether the enhanced service record is cacheable based on one or more policies. Moreover, policy logic block 634 can apply the policies to determine whether to serve a service request from a client device based on the enhanced service record. Response logic block 636 can allow switch 600 to respond to the client request based on the enhanced service record.

Figure 7:
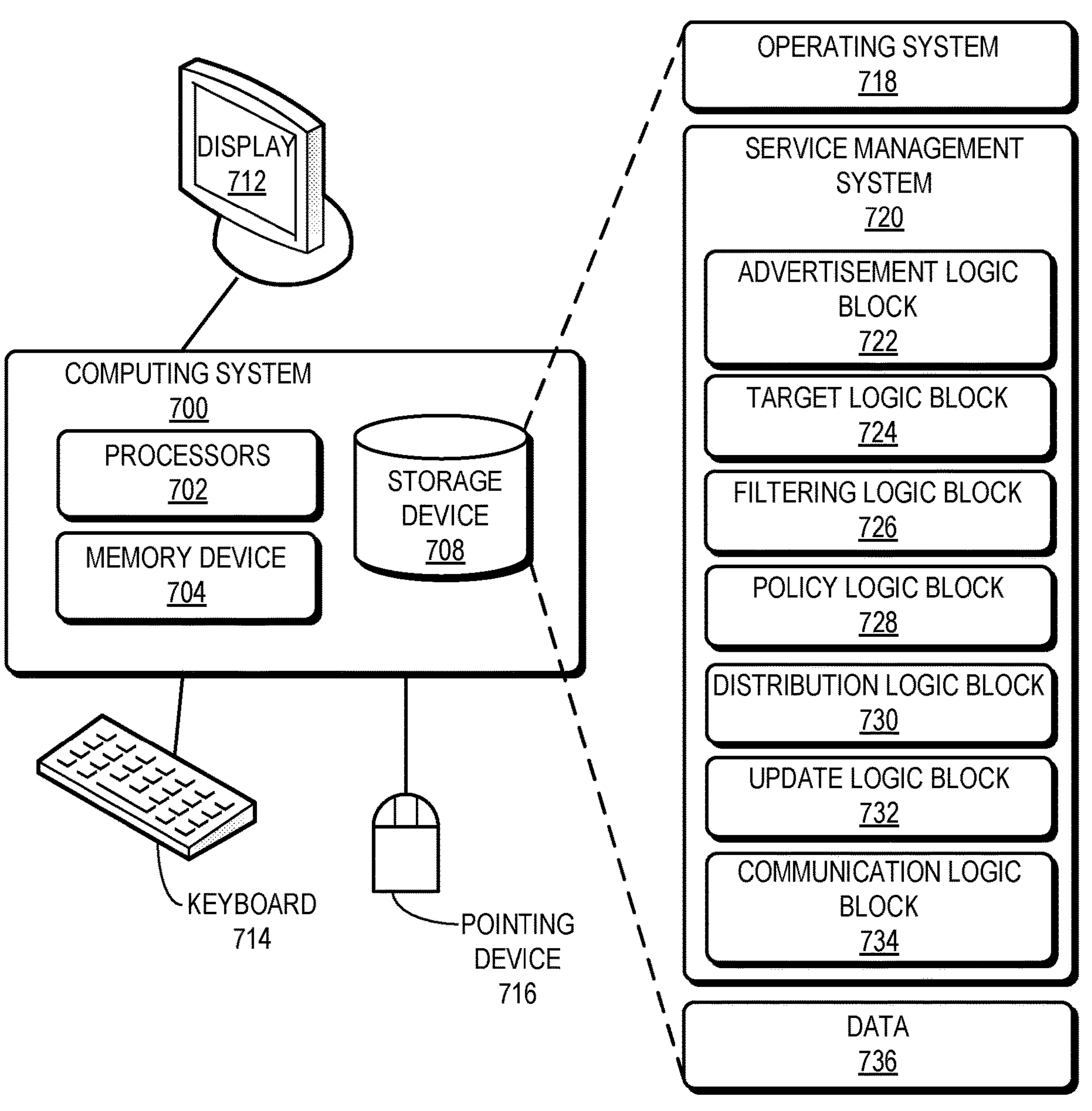
FIG. 7 illustrates an example of a computing system facilitating cloud-assisted service discovery in a wireless network, in accordance with an aspect of the present application.

FIG. 7 illustrates an example of a computing system facilitating cloud-assisted service discovery in a wireless network, in accordance with an aspect of the present application. A computing system 700 includes a set of processors 702, a memory device 704, and a storage device 708. Memory device 704 can include a set of volatile memory devices (e.g., dual in-line memory module (DIMM)). Furthermore, computing system 700 may be coupled to a display device 712, a keyboard 714, and a pointing device 716, if needed. Storage device 708 can store an operating system 718, a service management system 720, and data 736 associated with service management system 720. Service management system 720 can be a cloud service facilitating efficient service discovery in conjunction with one or more APs. Service management system 720 can operate based on a discovery protocol.

Service management system 720 can include instructions, which when executed by system 700 can cause system 700 to perform methods and/or processes described in this disclosure. Specifically, service management system 720 can include instructions for receiving and parsing a service advertisement (advertisement logic block 722). Moreover, service management system 720 can include instructions for selecting a set of target APs (target logic block 724). Furthermore, service management system 720 can include instructions for applying license filtering on the service records in the service advertisement (filtering logic block 726).

Service management system 720 can include instructions for applying one or more policies on the service records (policy logic block 728). Service management system 720 can also include instructions for receiving a policy configured by a user (policy logic block 728). In addition, service management system 720 can include instructions for generating AP-level policies from the one or more policies (policy logic block 728). Moreover, service management system 720 can include instructions for distributing the service records and the AP-level policies to the target APs (distribution logic block 730). Service management system 720 can also include instructions for receiving an updated service record and propagate the update to the target APs (update logic block 732).

Service management system 720 may further include instructions for sending and receiving packets (communication logic block 734). Such packets can include service advertisements and distribution packets. Data 736 can include any data that can facilitate the operations of service management system 720. Data 736 can include, but is not limited to, one or more policies, configurations, stored service records, location information of a respective AP, service identifiers, sequence numbers, and policy identifiers.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a system for facilitating service discovery at an access point. During operation, the system can receive, from a cloud-based service management system, an enhanced record indicating a set of services provided by a service-providing device (SPD). The enhanced record can be associated with one or more policies that indicate which device is eligible for receiving a service provided by the SPD. The system can cache the enhanced record in a service cache in a local storage device of the access point. The system can then receive a request for discovering a service from a client device wirelessly coupled to the access point. Subsequently, the system can determine whether to respond to or filter out the request based on the enhanced record and the one or more policies. Upon determining not to filter out the request, the system can respond to the request based on the enhanced record.

In a variation on this aspect, the system can receive an update to the enhanced record, wherein the update is indicated based on a sequence number. The system can then cache the updated enhanced record in the service cache based on the sequence number.

In a variation on this aspect, the system can receive the one or more policies and store them in a data structure. The enhanced record in the service cache can then correspond to the one or more policies in the data structure.

In a variation on this aspect, the access point can be in a set of target access points within a predetermined vicinity of the SPD. Here, a respective target access point can store the enhanced record.

In a variation on this aspect, the one or more policies can include a role-based segmentation rule that indicates whether a first role of the client device is permitted to exchange traffic with a second role of the SPD.

In a variation on this aspect, the system can receive a service advertisement comprising a service record. If a match is detected for the service record in the service cache, the system can suppress the service advertisement.

In a variation on this aspect, the enhanced record can be associated with a set of broadcast domains that are allowed to receive the set of services from the SPD.

In a variation on this aspect, the enhanced record can be an enhanced multicast domain name service (mDNS) record. The request can then be based on a Bonjour service.

In a variation on this aspect, upon determining to filter out the request, the system can refrain from responding to the request.

Another aspect of the present technology can provide a system for facilitating service discovery on a cloud-based service manager. During operation, the system can receive a service advertisement from an access point. Here, the service manager facilitates service discovery from the access point. The system can obtain, from the service advertisement, a service record indicating a set of services provided by a service-providing device (SPD). The system can then apply one or more policies to the service record to generate an enhanced record. Subsequently, the system can determine a set of target access points for locally caching the enhanced record based on a selection mechanism. Here, a respective target access point is capable of responding to a request for the set of services received based on the locally cached enhanced record. The system can send a distribution packet comprising the enhanced record to a respective target access point. The enhanced record can be associated with one or more access-point-level policies implementable at the target access point.

In a variation on this aspect, the system can detect an update to the service record based on a subsequent service advertisement. The system can then send a distribution packet with the updated service record, wherein the update is indicated by a sequence number.

In a variation on this aspect, the system can filter the service record based on a license to determine access points eligible to cache the service record.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:

receiving, by an access point (AP) from a service management system, a service record indicating a service provided by a service-providing device (SPD), and a policy associated with the service record, wherein the policy indicates which of one or more client devices is eligible for receiving the service provided by the SPD;

adding, by the AP, the received service record and information of the policy to an entry of a service cache in a local storage device of the AP;

receiving, by the AP, a request for discovering a first service from a first client device wirelessly coupled to the AP of the one or more client devices;

determining, by the AP, whether to filter out the request based on the entry of the service cache and the policy; and based on determining not to filter out the request, responding, by the AP, to the request based on the received service record.

2. The method of claim 1, further comprising:

receiving, at the AP from the service management system, an update to the service record, wherein the update is indicated based on a sequence number; and caching the updated service record in the service cache based on the sequence number.

3. The method of claim 2, further comprising:

determining, by the AP, that the service record has been updated based on detecting that the sequence number is a new sequence number different from an existing sequence number in the entry of the service cache.

4. The method of claim 1, wherein the AP is in a set of target APs within a vicinity of the SPD, and wherein the service record and the policy are distributed by the service management system to the set of target APs for caching at the set of target APs.

5. The method of claim 1, wherein the policy includes a role-based segmentation rule that indicates whether a first role of the first client device is permitted to exchange traffic with a second role of the SPD.

6. The method of claim 1, further comprising:

receiving, by the AP from the SPD, a service advertisement comprising the service record;

sending, by the AP in response to the service advertisement, the service record to the service management system, wherein the service record and the policy received by the AP from the service management system are included in a packet sent by the service management system in response to receiving the service record from the AP, and wherein the adding of the service record and the information of the policy to the entry of the service cache is responsive to the packet from the service management system.

7. The method of claim 1, wherein the information of the policy added by the AP to the entry of the service cache comprises a policy identifier of the policy.

8. The method of claim 7, further comprising:

storing, by the AP, the policy received from the service management system in a policy data structure in the AP.

9. The method of claim 1, comprising:

based on determining to filter out the request, refraining, by the AP, from responding to the request.

10. A non-transitory computer-readable storage medium comprising instructions that when executed cause an access point (AP) to:

receive, at the AP from a service management system, a service record indicating a service provided by a service-providing device (SPD), and a policy associated with the service record, wherein the policy indicates which of one or more client devices is eligible for receiving the service provided by the SPD;

add the received service record and information of the policy to an entry of a service cache in a local storage device of the AP;

receive, at the AP, a request for discovering a first service from a first client device wirelessly coupled to the AP of the one or more client devices;

determine whether to filter out the request based on the entry of the service cache and the policy; and based on determining not to filter out the request, respond, by the AP, to the request based on the received service record.

11. The non-transitory computer-readable storage medium of claim 10, wherein the instructions when executed cause the AP to:

receive, at the AP, an update to the service record, wherein the update is indicated based on a sequence number; and cache the updated service record in the service cache based on the sequence number.

12. The non-transitory computer-readable storage medium of claim 11, wherein the instructions when executed cause the AP to:

determine that the service record has been updated based on detecting that the sequence number is a new sequence number different from an existing sequence number in the entry of the service cache.

13. The non-transitory computer-readable storage medium of claim 10, wherein the AP is in a set of target APs within a vicinity of the SPD, and wherein the service record and the policy are distributed by the service management system to the set of target APs for caching at the set of target APs.

14. The non-transitory computer-readable storage medium of claim 10, wherein the policy includes a role-based segmentation rule that indicates whether a first role of the first client device is permitted to exchange traffic with a second role of the SPD.

15. The non-transitory computer-readable storage medium of claim 10, wherein the instructions when executed cause the AP to:

receive, at the AP from the SPD, a service advertisement comprising the service record; and in response to determining that the service record of the service advertisement is not yet cached in the service cache, send, from the AP, the service record to the service management system, wherein the service record and the policy received by the AP from the service management system are included in a packet sent by the service management system in response to receiving the service record from the AP, and wherein the adding of the service record and the information of the policy to the entry of the service cache is responsive to the packet from the service management system.

16. The non-transitory computer-readable storage medium of claim 10, wherein the information of the policy added by the AP to the entry of the service cache comprises a policy identifier of the policy.

17. The non-transitory computer-readable storage medium of claim 16, wherein the instructions when executed cause the AP to:

store, by the AP, the policy received from the service management system in a policy data structure in the AP.

18. A system comprising:

a hardware processor; and a non-transitory storage medium storing instructions of a service manager, the instructions executable on the hardware processor to:

receive, at the service manager, a service advertisement from an access point (AP);

obtain, from the service advertisement, a service record indicating a service provided by a service-providing device (SPD);

identify a policy to associate with the obtained service record, wherein the policy indicates which of one or more client devices is eligible for receiving the service provided by the SPD;

select a set of target APs for locally caching the service record and information of the policy; and send, from the service manager, a distribution packet comprising the service record and the information of the policy to each target AP of the set of target APs, wherein target APs of the set of target APs are to locally cache the service record and the information of the policy in entries of respective service caches of the target APs of the set of target APs, and wherein the service record and the policy are useable by a target AP of the set of target APs in determining whether to respond to a request for the service from a first client device of the one or more client devices.

19. The system of claim 18, wherein the instructions are executable on the hardware processor to further:

detect an update to the service record based on a subsequent service advertisement; and send, from the service manager, a further distribution packet with the updated service record to the set of target APs.

20. The system of claim 18, wherein the instructions are executable on the hardware processor to further:

apply filtering based on a license to select the set of target APs eligible to cache the service record.

* * * * *